United States Patent [19]
Tung

[11] Patent Number: 6,146,164
[45] Date of Patent: Nov. 14, 2000

[54] ELECTRONIC CARD CONNECTOR WITH FOLDABLE CARD RELEASE BAR

[75] Inventor: Shun-Chi Tung, Tu-Chen, Taiwan

[73] Assignee: Hon Hai Precision Ind. Co., Ltd., Taipei Hsien, Taiwan

[21] Appl. No.: 09/328,168

[22] Filed: Jun. 8, 1999

[30] Foreign Application Priority Data

Dec. 15, 1998 [TW] Taiwan .................................. 87220862

[51] Int. Cl.[7] .................................................. H01R 13/62
[52] U.S. Cl. ............................................. 439/159; 439/160
[58] Field of Search ..................................... 439/159, 160, 439/152, 153–157

[56] References Cited

U.S. PATENT DOCUMENTS

| | | | |
|---|---|---|---|
| 4,197,572 | 4/1980 | Aimar | 361/755 |
| 5,730,610 | 3/1998 | Hsia et al. | 439/160 |
| 5,745,345 | 4/1998 | Deguchi | 361/741 |
| 5,997,325 | 12/1999 | Hara | 439/159 |
| 6,000,958 | 12/1999 | Ishida et al. | 439/159 |

*Primary Examiner*—Brian Sircus
*Assistant Examiner*—Son V. Nguyen
*Attorney, Agent, or Firm*—Wei Te Chung

[57] ABSTRACT

An electronic card connector includes a header having two opposite guide arms for receiving an electronic card therein. Contact elements are retained in the header and are electrically engageable with the electronic card. A card release bar is axially and movably mounted to one of the guide arms for operating a card release mechanism to release the electronic card from the connector. The release bar includes a button section having a fixed block fixed to the card release bar and a movable block pivotally mounted to the fixed block to be movable between a stowed position and a working position. Snap-fit elements are provided between the movable block and the fixed block corresponding to the stowed position and the working position for releasably retaining the movable block at the stowed position and the working position. A spring is mounted between the fixed block and the movable block for biasing the movable block toward the stowed position. In the absence of the snap-fit means, the spring helps to retain the movable block at the stowed position.

3 Claims, 14 Drawing Sheets

ELECTRONIC CARD CONNECTOR WITH FOLDABLE CARD RELEASE BAR

BACKGROUND OF THE INVENTION

1. Field of the Invention

The present invention generally relates to an electronic card connector, and in particular to an electronic card connector having a foldable card release bar.

2. The Prior Art

An electronic card connector releasably connects an electronic card, such as a memory card, to a main board of a host machine for expansion of resources thereof. The electronic card connector is provided with a release bar for releasing the electronic card from the connector. The release bar comprises a button section extending beyond the connector for being accessible by a user. The button section may be inadvertently contacted and thus actuated by the user thereby possibly damaging the electronic card and the card release bar.

A foldable card release bar is disclosed in Taiwan Patent Application No. 85103753 which teaches a card release bar having a button section pivotally attached thereto whereby the button section may be stowed within a casing of the host machine without inadvertent contact by the user. However, no means is provided in the conventional card release bar for securing the button section at a stowed position whereby the button may be positioned outside the casing of the host machine and inadvertently damaged. Furthermore, there is no means for automatically disposing the button section at the stowed position when not in use.

In addition, the foldable card release bar disclosed in Taiwan Patent Application No. 85103753 has a complicated structure which not only increases costs but is also easily damaged.

It is thus desirable to have an electronic card connector having a foldable card release bar that eliminates the problems mentioned above.

SUMMARY OF THE INVENTION

Accordingly, an object of the present invention is to provide an electronic card connector having means for securing a movable button of a foldable card release bar at a stowed position.

Another object of the present invention is to provide an electronic card connector having means for automatically driving a movable button of the card release bar to a stowed position when not in use.

To achieve the above objects, an electronic card connector in accordance with the present invention comprises a header having two opposite guide arms for receiving an electronic card therein. Contact elements are retained in the header and are electrically engageable with the electronic card. A card release bar is axially and movably mounted to one of the guide arms for operating a card release mechanism to release the electronic card from the connector. The release bar includes a button section having a fixed block fixed to the card release bar and a movable block pivotally mounted to the fixed block to be movable between a stowed position and a working position. Snap-fit elements are provided between the movable block and the fixed block corresponding to the stowed position and the working position for releasably retaining the movable block at the stowed position and the working position. A spring is mounted between the fixed block and the movable block for biasing the movable block toward the stowed position. In the absence of the snap-fit means, the spring helps to retain the movable block at the stowed position.

BRIEF DESCRIPTION OF THE DRAWINGS

The present invention will be apparent to those skilled in the art by reading the following description of preferred embodiments thereof, with reference to the accompanying drawings, in which.

DETAILED DESCRIPTION OF THE PREFERRED EMBODIMENTS

Figure 1:
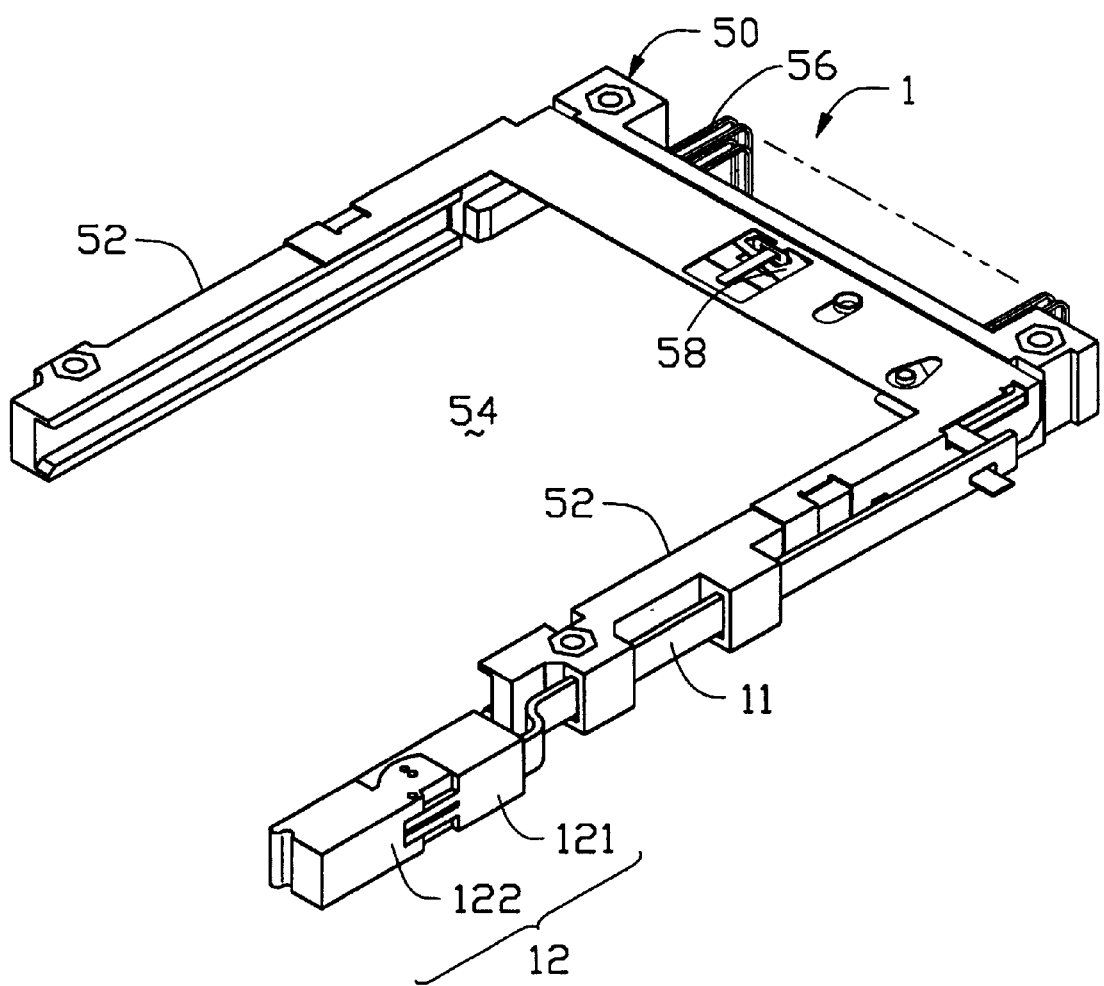
FIG. 1 is a perspective view of an electronic card connector constructed in accordance with a first embodiment of the present invention.

Referring to the drawings and in particular to FIG. 1, an electronic card connector 1 in accordance with a first embodiment of the present invention comprises an insulative header 50 having two guide arms 52 extending from opposite ends thereof and defining a card receiving space 54 therebetween for receiving an electronic card (not shown) therein. A plurality of contact elements 56 are retained in the header 50 and partially extend into the card receiving space 54 for electrically engaging with the electronic card. A card release bar 11 is movably mounted to one of the guide arms 52 for operating a card release mechanism 58 to release the electronic card from the connector 1. A foldable button section 12 is attached to a free end of the card release bar 11.

Figure 2:
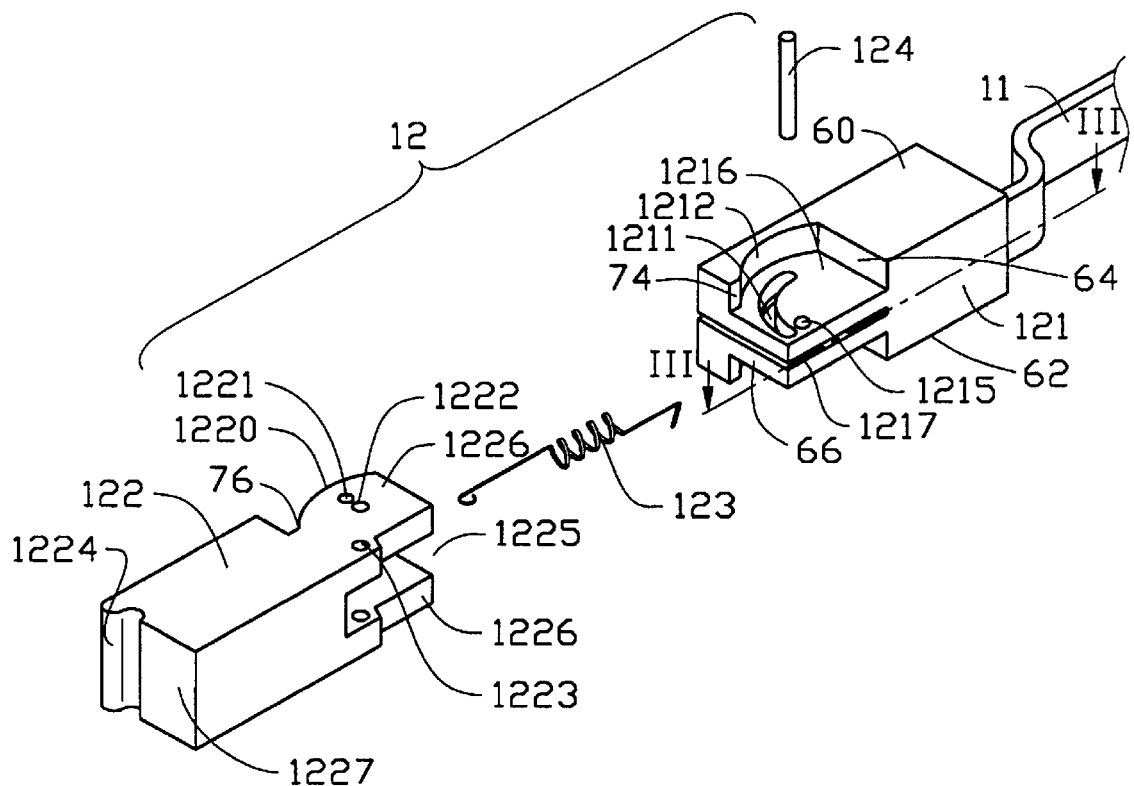
FIG. 2 is an exploded view of a foldable button section of a card release bar of the electronic card connector of FIG. 1.
Figure 3:
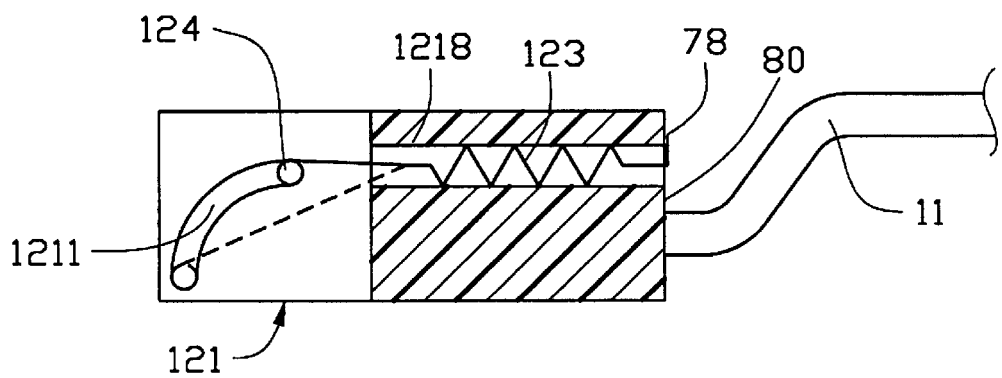
FIG. 3 is a cross-sectional view taken along line III—III of FIG. 2.

As shown in FIGS. 2 and 3, the foldable button section 12 comprises a fixed block 121 fixed to the free end of the card release bar 11 and a movable block 122 pivotally mounted to the fixed block 121. A helical spring 123 is mounted between the fixed block 121 and the movable block 122 for biasing the movable block 121 at a stowed position as shown in FIGS. 4A and 5A.

Two recesses 1216 are respectively formed in top and bottom faces 60, 62 of the fixed block 121. Each recess 1216 is defined by a first side wall 1212 and a second side wall 64. A separating plate 66 is thus formed between the recesses 1216. An arcuate slot 1211 is defined in the separating plate 66 of the fixed block 121 and communicates between the recesses 1216. The movable block 122 comprises two spaced tabs 1226 defining a space 1225 therebetween for receiving the separating plate 66 with the tabs 1226 slidably received in the corresponding recesses 1216. A bore 1221 is defined in each of the tabs 1226 corresponding to the arcuate slot 1211 for receiving and retaining a pin 124 extending through and movable along the arcuate slot 1211 for guiding the movable block 122 to pivot about an imaginary center point of the arcuate slot 1211 with respect to the fixed block 121 between a stowed position (FIGS. 4A and 5A) and a working position (FIGS. 4B and 5C). The first side wall 1212 is formed with an arcuate configuration for matingly engaging with an arcuate edge 1220 of the corresponding tab 1226 for smoothly guiding the pivotal movement of the movable block 122 with respect to the fixed block 121.

Figure 4A:
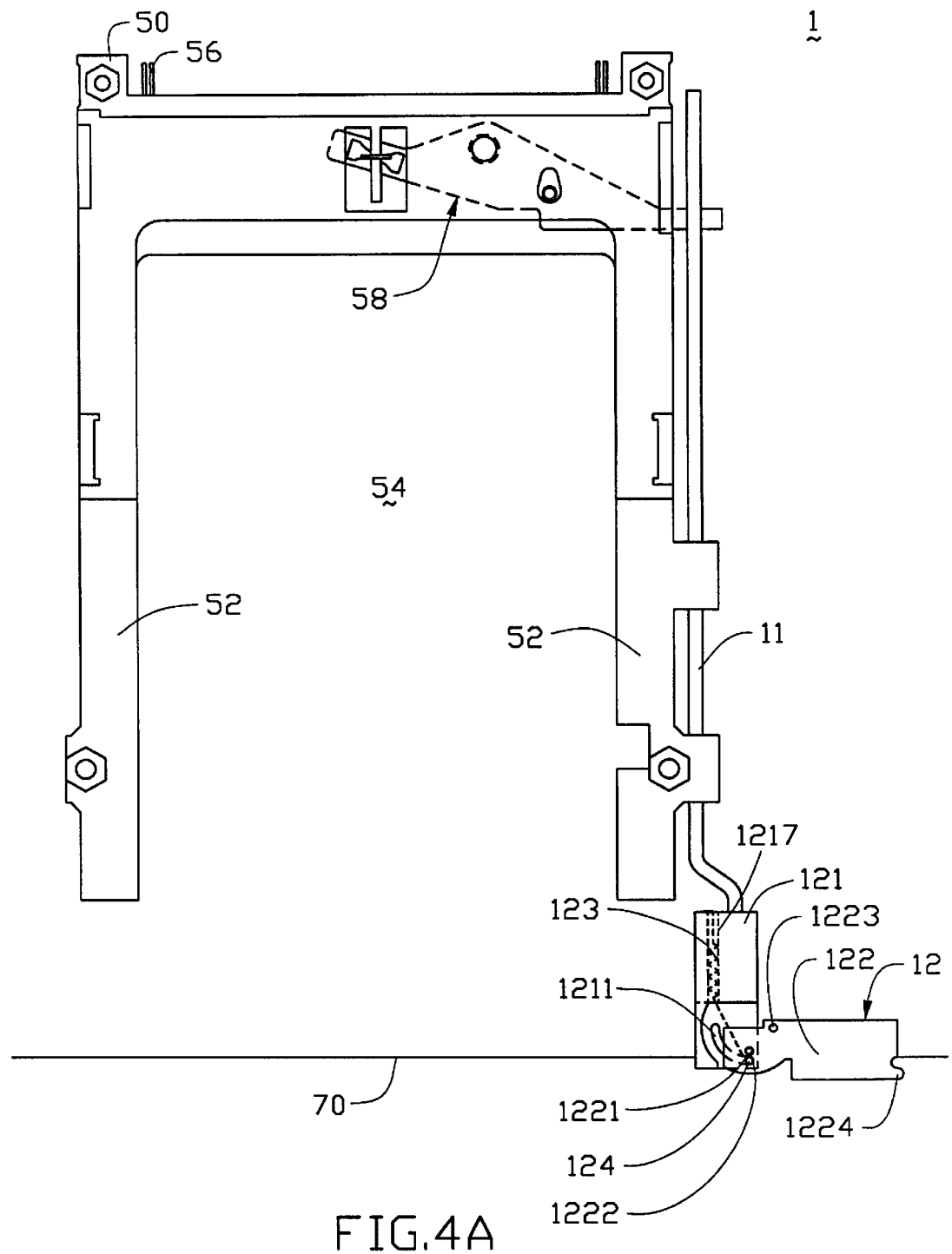
FIG. 4A is a top view of FIG. 1 showing the movable block of the foldable button section at a stowed position.
Figure 4B:
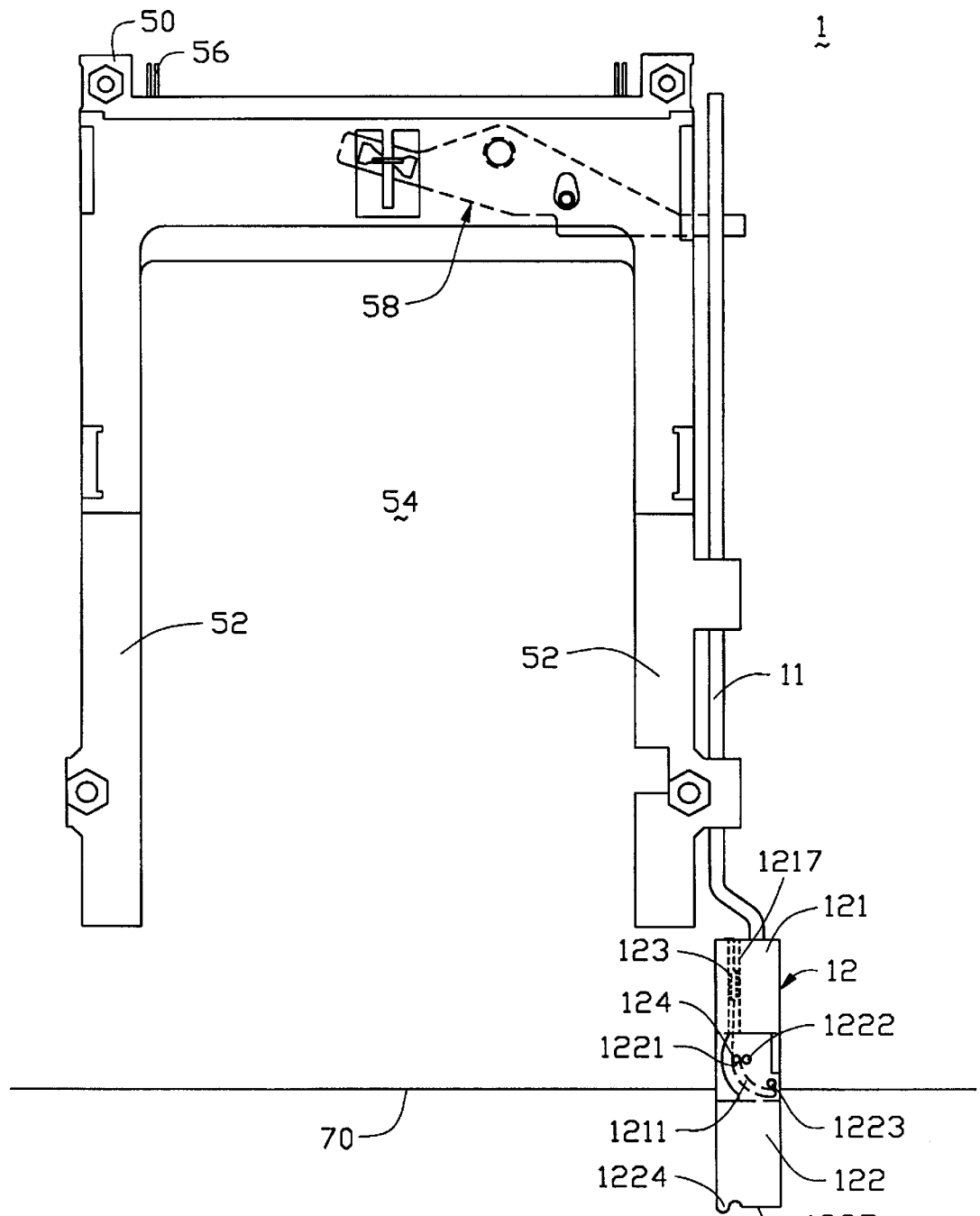
FIG. 4B is a top view of the electronic card connector of FIG. 1 showing the movable block of the foldable button section at a working position.
Figure 5A:
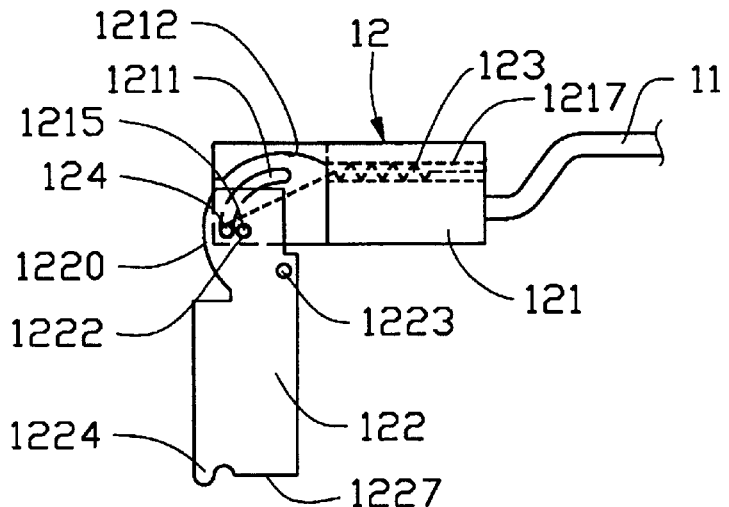
FIG. 5A is a top view of the movable block of the foldable button of the first embodiment at the stowed position.

When located at the stowed position, the movable block 122 is substantially normal to the fixed block 121 and is substantially hidden in a casing 70 (FIG. 4A). When located at the working position, the movable block 122 is substantially aligned with the fixed block 121 and extends beyond the casing 70 (FIG. 4B) thereby allowing a user to apply an axial force to push the card release bar 11 inward.

Each arcuate first side wall 1212 of the fixed block 121 has an extension 74 engageable with a corresponding face 76 of the movable block 122 for stopping the pivotal movement of the movable block 122 when the movable block 122 reaches the working position and for supporting the movable block 122 at the working position.

Each tab 1226 of the movable block 122 defines two holes 1222, 1223 respectively corresponding to the stowed position and the working position. A boss 1215 is formed on each face of the separating plate 66 and extends into each of the recesses 1216 of the fixed block 121 to selectively engage with the holes 1222, 1223 for retaining the movable block 122 at the stowed position and the working position, respectively.

A slot 1217 is defined in the fixed block 121 substantially parallel to the top and bottom faces 60, 62 thereof for accommodating the spring 123. The spring 123 has a first end 78 engaging with a rear face 80 of the fixed block 121 and a second end 82 attached to the pin 124 thereby applying a biasing force on the movable block 122 for biasing the movable block 122 toward the stowed position.

Figure 5B:
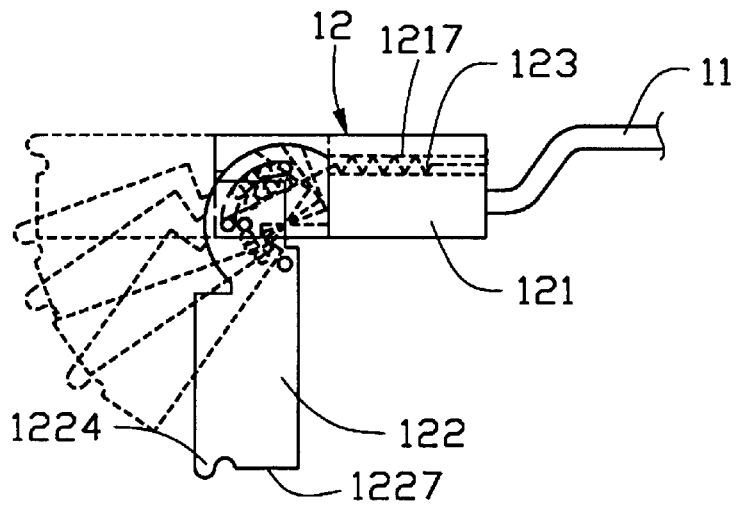
FIG. 5B is a top view of the movable block of the foldable button of the first embodiment moving from the stowed position to the working position.
Figure 5C:
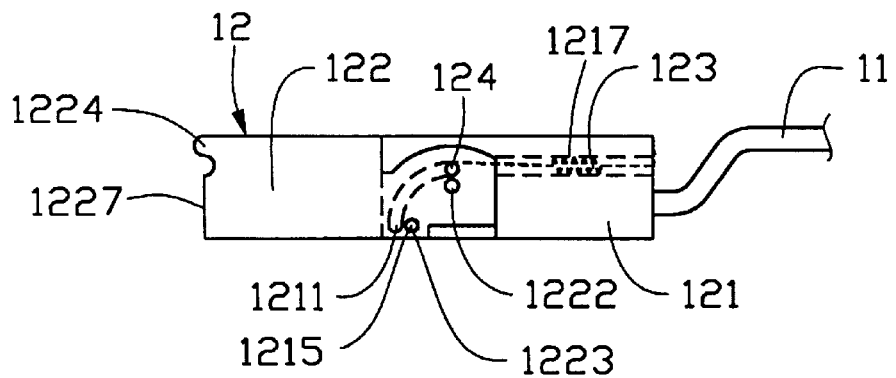
FIG. 5C is a top view of the movable block of the foldable button of the first embodiment at the working position.

The movable block 122 forms a projection 1224 on an outer face 1227 thereof for allowing a user to grip and move the movable block 122 toward the working position. The spring 123 automatically drives the movable block 122 toward the stowed position once the movable block 122 is released by the user. FIGS. 5A, 5B and 5C show sequential steps of moving the movable block 122 from the stowed position to the working position.

Figure 6:
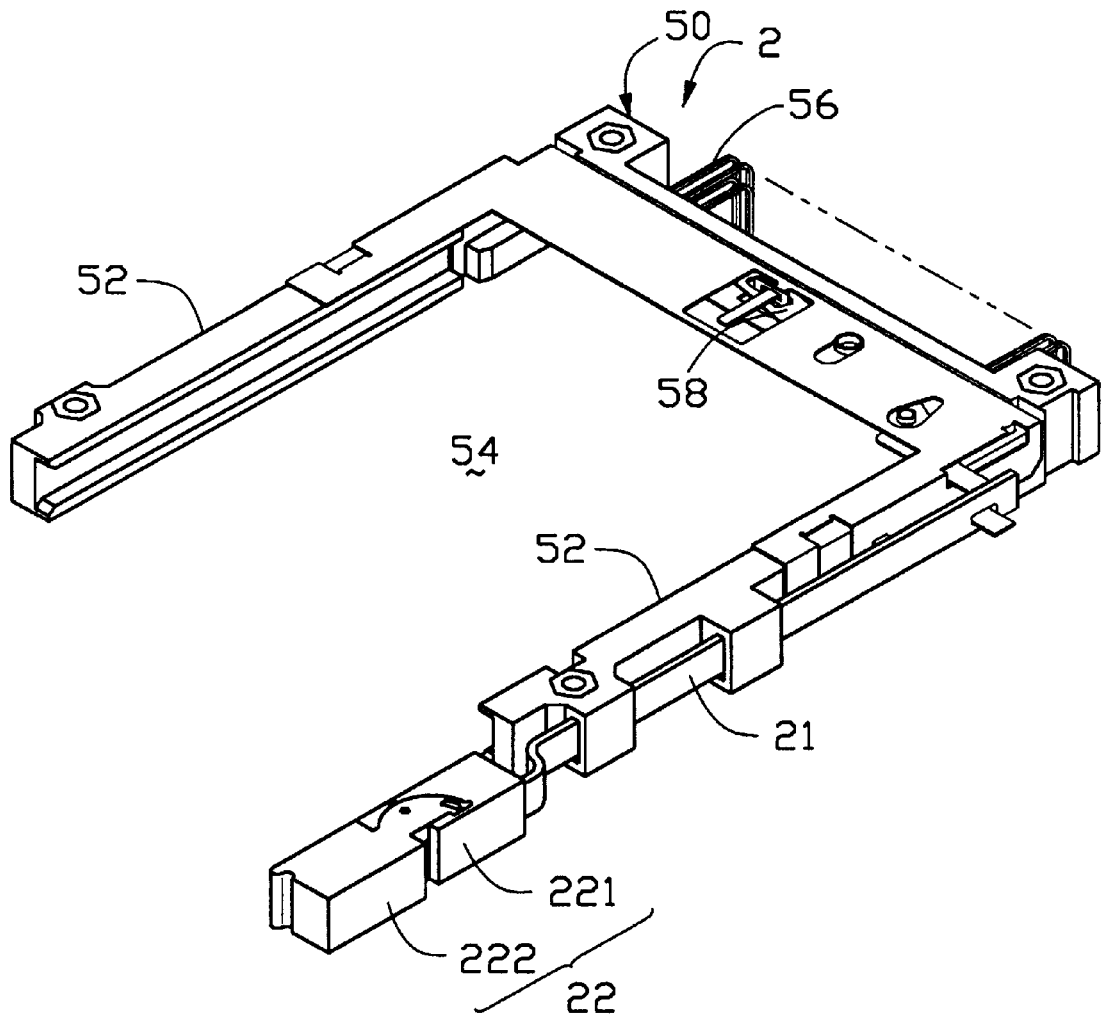
FIG. 6 is a perspective view of an electronic card connector constructed in accordance with a second embodiment of the present invention.

Referring to FIG. 6, an electronic card connector 2 in accordance with a second embodiment of the present invention is similar to the electronic card connector 1 of the first embodiment. The electronic card connector 2 comprises an insulative header 50 having two guide arms 52 extending from opposite ends thereof and defining a card receiving space 54 therebetween for receiving an electronic card (not shown) therein. A plurality of contact elements 56 are retained in the header 50 and partially extend into the card receiving space 54 for electrically engaging with the electronic card. A card release bar 21 is movably mounted to one of the guide arms 52 for operating a card release mechanism 58 to release the electronic card from the connector 2. A foldable button section 22 is attached to an outer end of the card release bar 21.

Figure 7:
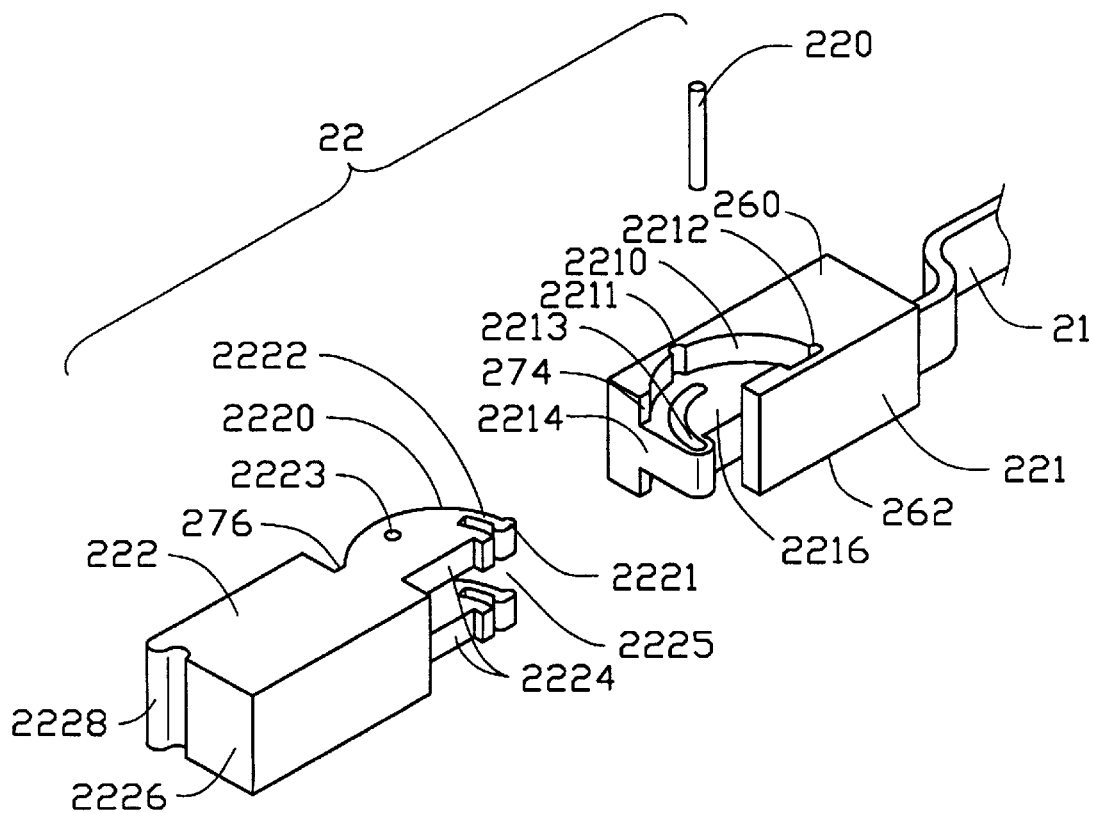
FIG. 7 is an exploded view of a foldable button section of a card release bar of the electronic card connector of FIG. 6.

As shown in FIG. 7, the foldable button section 22 comprises a fixed block 221 fixed to a free end of the card release bar 21 and a movable block 222 pivotally mounted to the fixed block 221. Two recesses 2216 are formed in top and bottom faces 260, 262 of the fixed block 221. Each recess 2216 is defined by an arcuate side wall 2210. A separating plate 2214 is formed between the recesses 2216. An arcuate slot 2213 is defined in the separating plate 2214 of the fixed block 221 and communicates between the recesses 2216. The movable block 122 comprises two spaced tabs 2224 defining a space 2225 therebetween for receiving the separating plate 2214 with the tabs 2224 slidably received in the corresponding recesses 2216. A bore 2223 is defined in each of the tabs 2224 corresponding to the arcuate slot 2213 for receiving and retaining a pin 220 extending through and movable along the arcuate slot 2213 for guiding the movable block 222 to pivot about an imaginary center point of the arcuate slot 2213 with respect to the fixed block 221 between a stowed position (FIGS. 8A and 9A) and a working position (FIGS. 8B and 9B). The arcuate side wall 2210 of the fixed block 221 matingly engages with an arcuate edge 2220 of the corresponding tab 2224 for smoothly guiding the pivotal movement of the movable block 222 with respect to the fixed block 221.

Figure 8A:
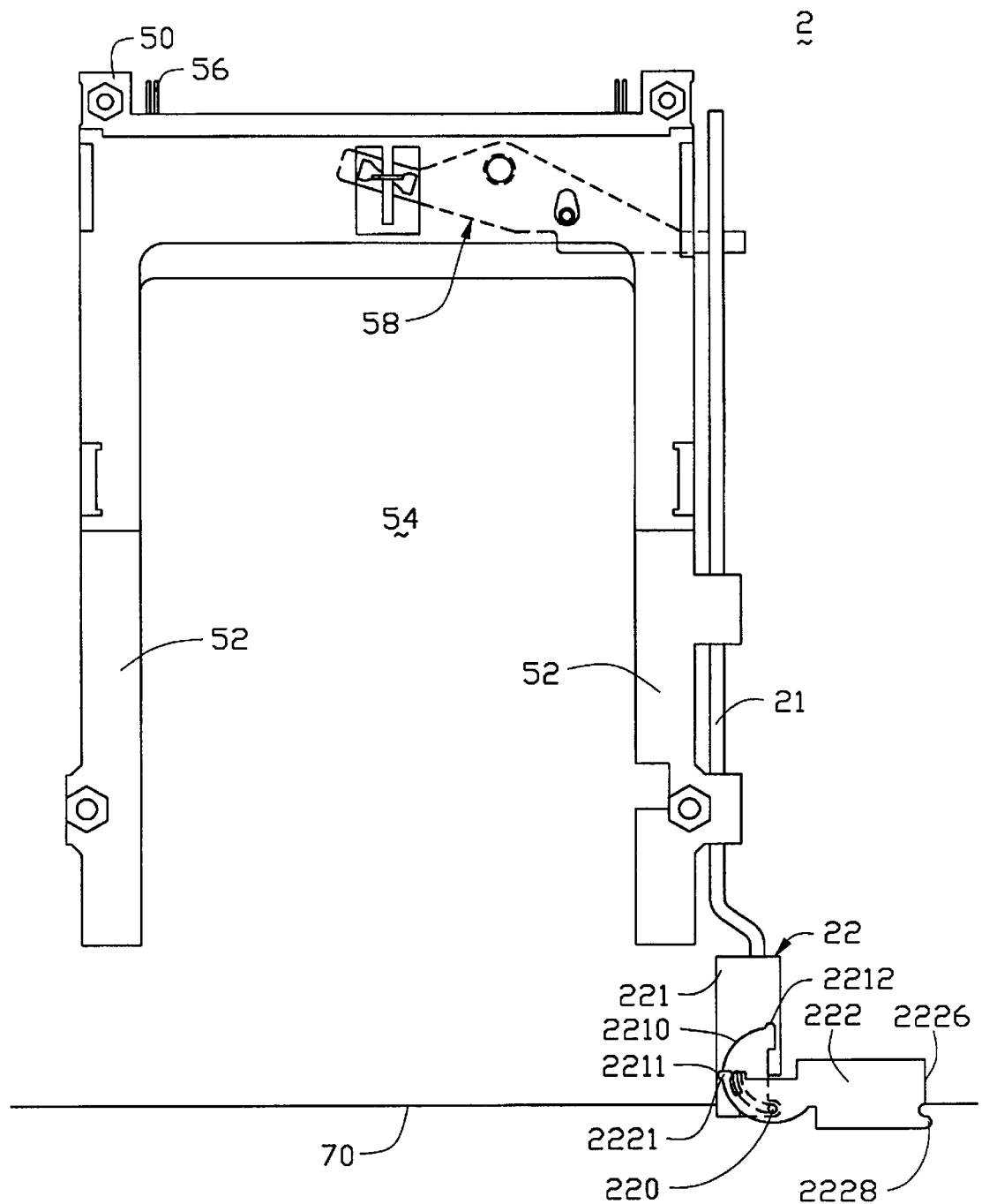
FIG. 8A is a top view of FIG. 6 showing the movable block of the foldable button at a stowed position.
Figure 8B:
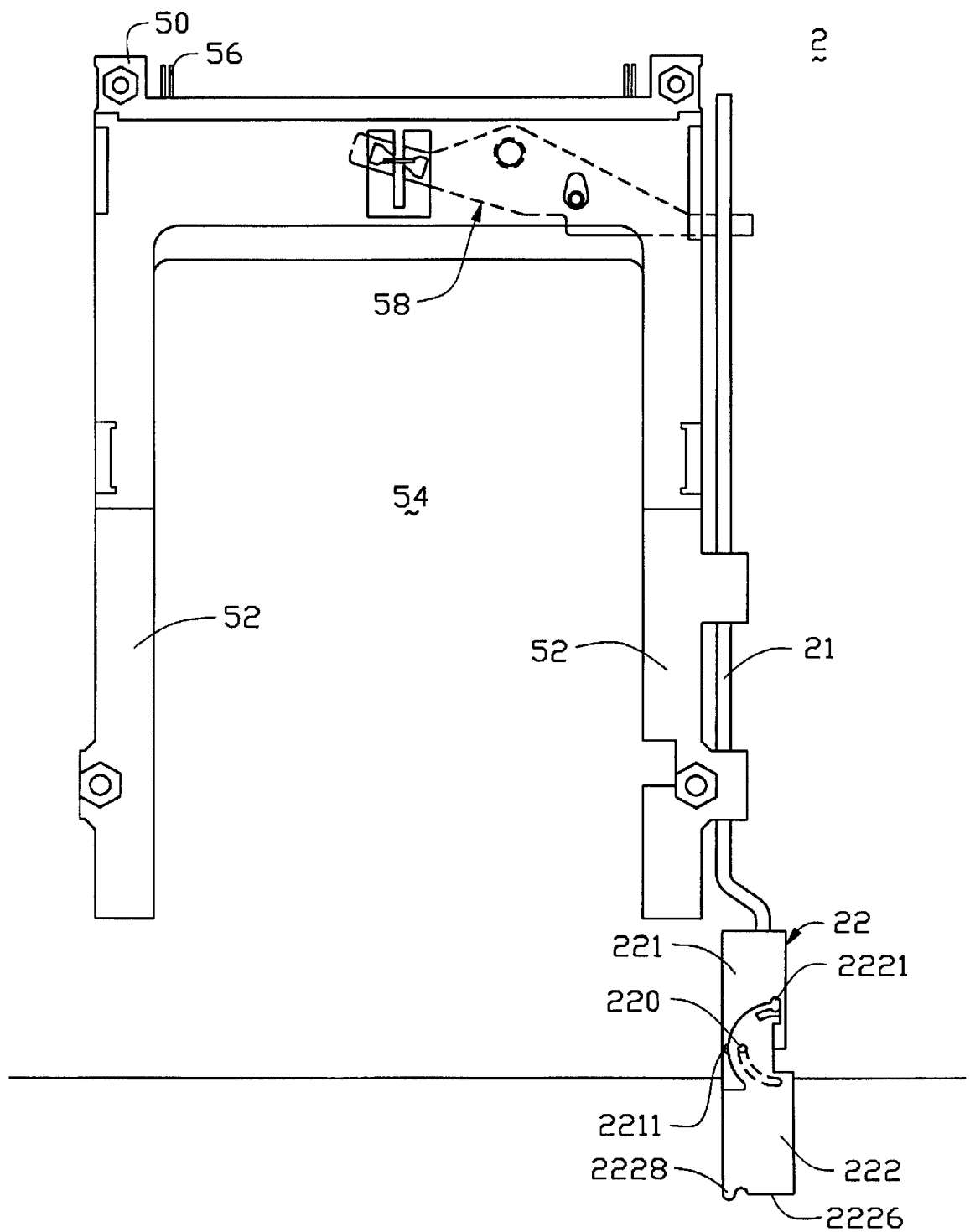
FIG. 8B is a top view of FIG. 6 showing the movable block of the foldable button at a working position.
Figure 9A:
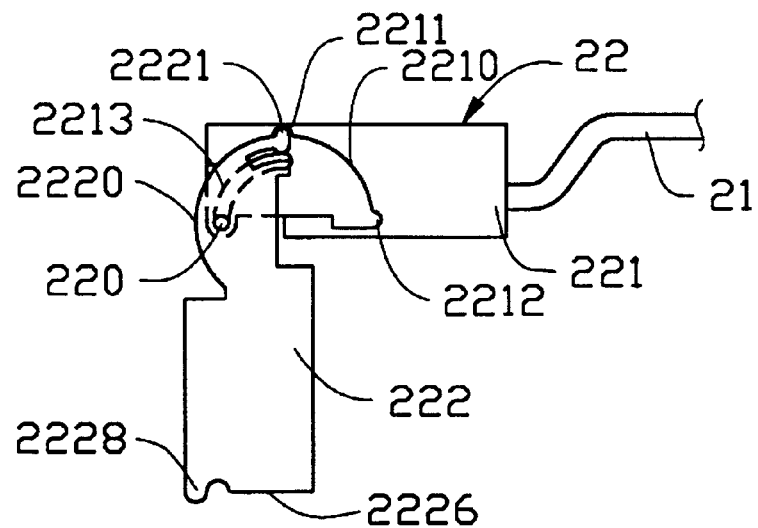
FIG. 9A is a top view of the movable block of the button section of FIG. 6 at the stowed position.
Figure 9B:
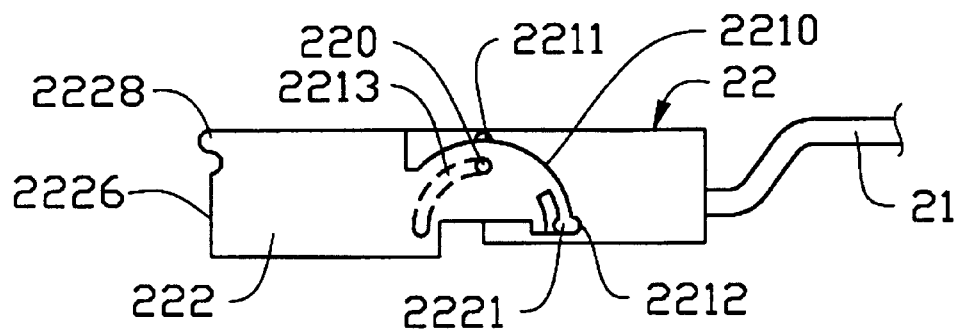
FIG. 9B is a top view of the movable block of the button section of FIG. 6 at the working position.

When located at the stowed position, the movable block 222 is substantially normal to the fixed block 221 and is substantially hidden in a casing 70 (FIG. 8A). When located at the working position, the movable block 222 is substantially aligned with the fixed block 221 and extends beyond the casing 70 (FIG. 8B) thereby allowing a user to apply an axial force to push the card release bar 21 inward.

Each arcuate first side wall 2210 of the fixed block 221 has an extension 274 engageable with a corresponding face 276 of the movable block 222 for stopping the pivotal movement of the movable block 222 when the movable block 222 reaches the working position and for supporting the movable block 222 at the working position.

Each tab 2224 of the movable block 222 forms a resilient finger 2222 supporting a barb 2221 thereon. Two notches 2211, 2212 are formed in and spaced along each arcuate side wall 2210 respectively corresponding to the stowed position and the working position. The barbs 2221 of the tabs 2224 of the movable block 222 are selectively snap fit into and releasably engage with the notches 2211, 2212 for retaining the movable block 222 at the stowed position and the working position.

A biasing spring is not included in the second embodiment. However, if desired, a spring may be arranged in the second embodiment similar to the first embodiment for automatically biasing the movable block 222 toward the stowed position.

The movable block 222 forms a projection 2228 on an outer face 2226 thereof for allowing a user to grip and move the movable block 222 to the working position.

Figure 10:
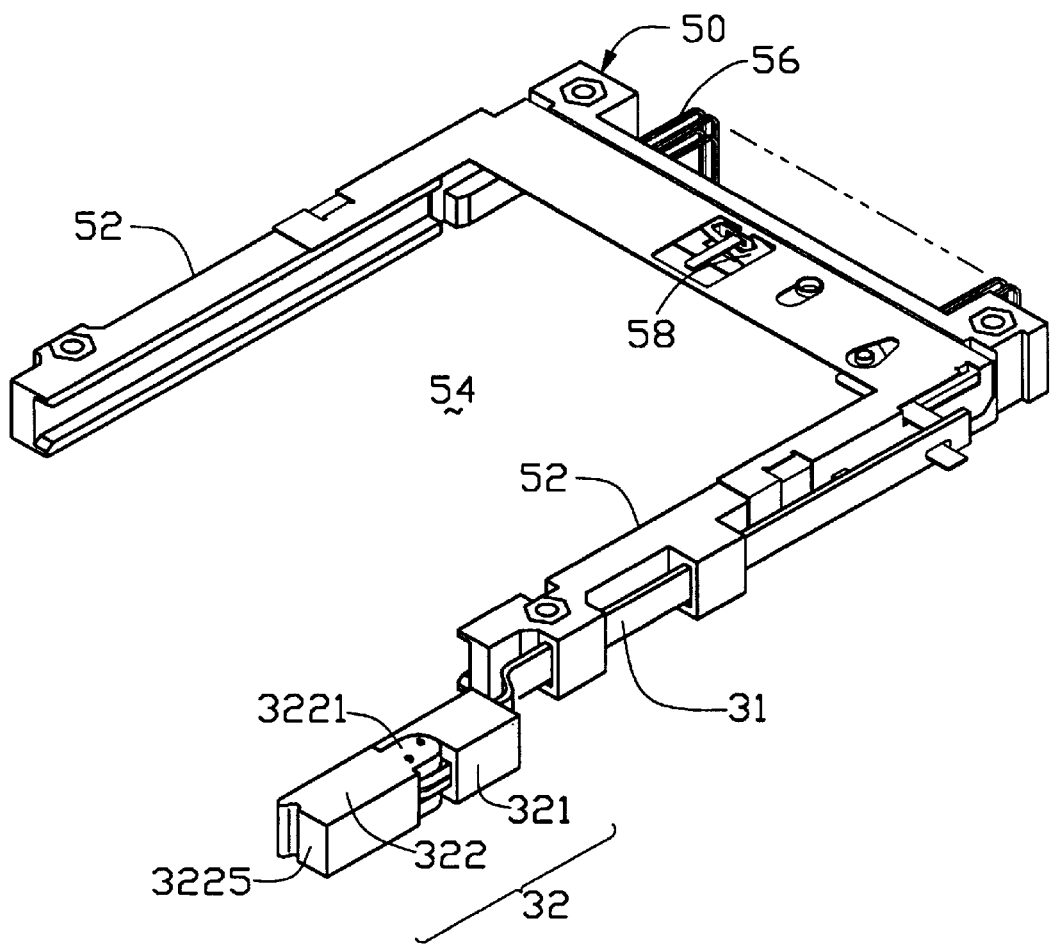
FIG. 10 is a perspective view of an electronic card connector constructed in accordance with a third embodiment of the present invention.

Referring to FIG. 10, an electronic card connector 3 in accordance with a third embodiment of the present invention comprises an insulative header 50 having two guide arms 52 extending from opposite ends thereof and defining a card receiving space 54 therebetween for receiving an electronic card (not shown) therein. A plurality of contact elements 56 are retained in the header 50 and partially extend into the card receiving space 54 for electrically engaging with the electronic card. A card release bar 31 is movably mounted to one of the guide arms 52 for operating a card release mechanism 58 to release the electronic card from the connector 3. A foldable button section 32 is attached to a free end of the card release bar 31.

Figure 11:
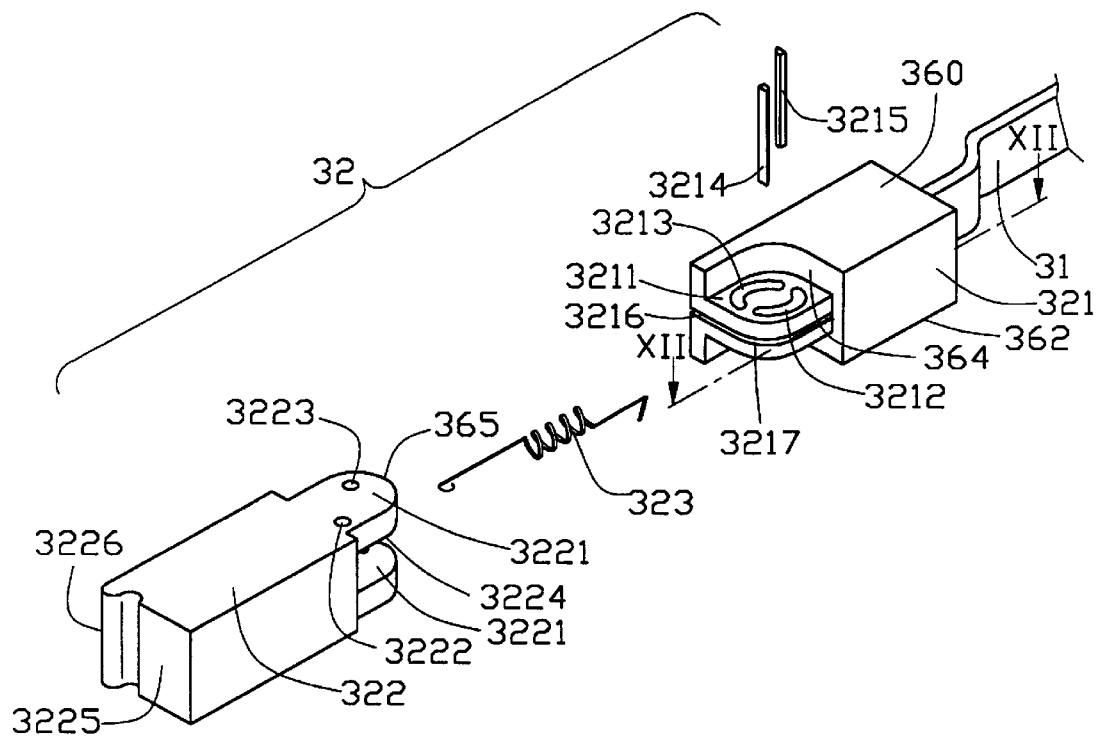
FIG. 11 is an exploded view of a movable block of the button section of a card release bar of the electronic card connector of FIG. 10.
Figure 12:
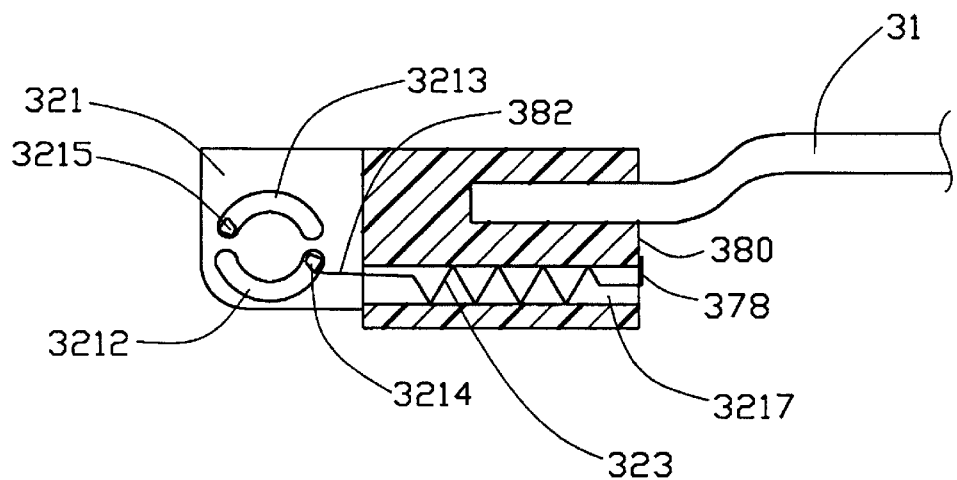
FIG. 12 is a cross-sectional view taken along line XII—XII of FIG. 11.

As shown in FIGS. 11 and 12, the foldable button section 32 comprises a fixed block 321 fixed to the free end of the card release bar 31 and a movable block 322 pivotally mounted to the fixed block 321. A helical spring 323 is mounted between the fixed block 321 and the movable block 322 for biasing the movable block 322 toward a stowed position as shown in FIG. 13A.

Two recesses 3211 are formed on top and bottom faces 360, 362 of the fixed block 321. Each recess 3211 is defined by an arcuate side wall 364. A separating plate 3216 is formed between the recesses 3211. Two arcuate slots 3212, 3213 having a common center are defined in the separating plate 3216 of the fixed block 321 in communication between the recesses 3211. The movable block 322 comprises two spaced tabs 3221 defining a space 3224 therebetween for receiving the separating plate 3216 with the tabs 3221 slidably received in the corresponding recesses 3211. Two bores 3222, 3223 are defined in each of the tabs 3221 corresponding to the arcuate slots 3212, 3213 for receiving and retaining two pins 3214, 3215 respectively extending through and movable along the arcuate slots 3212, 3213 for guiding the movable block 322 to pivot about the common center of the arcuate slots 3212, 3213 with respect to the fixed block 321 between a stowed position (FIG. 13A) and a working position (FIG. 13B). The pins 3214, 3215 may have a polygonal cross section, such as a trapezoidal shape as shown in FIG. 12. The arcuate side wall 364 matingly engages with an arcuate edge 365 of the corresponding tab 3221 for smoothly guiding the pivotal movement of the movable block 322 with respect to the fixed block 321.

Figure 13A:
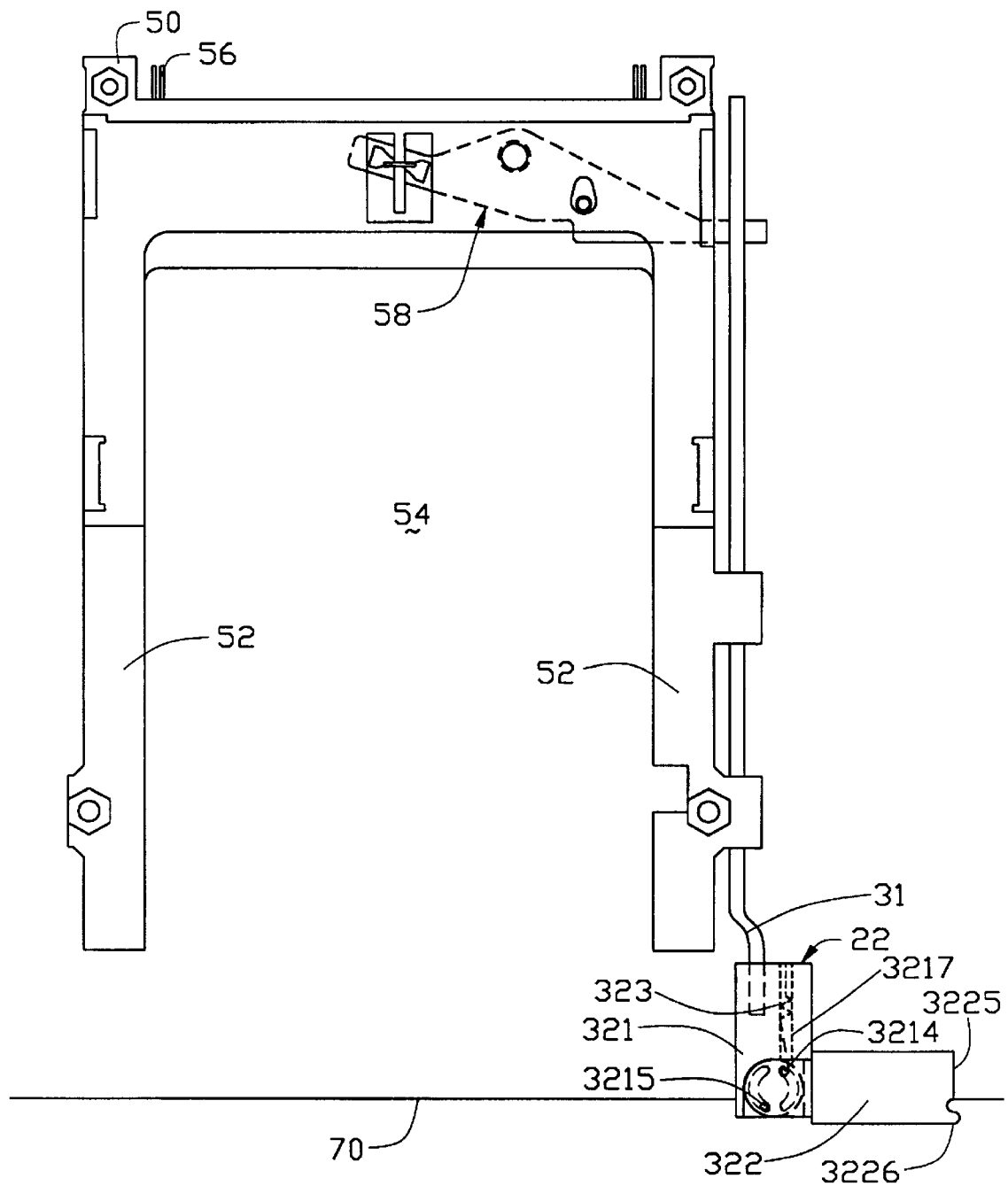
FIG. 13A is a top view of FIG. 10 showing the movable block of the button section at a stowed position.
Figure 13B:
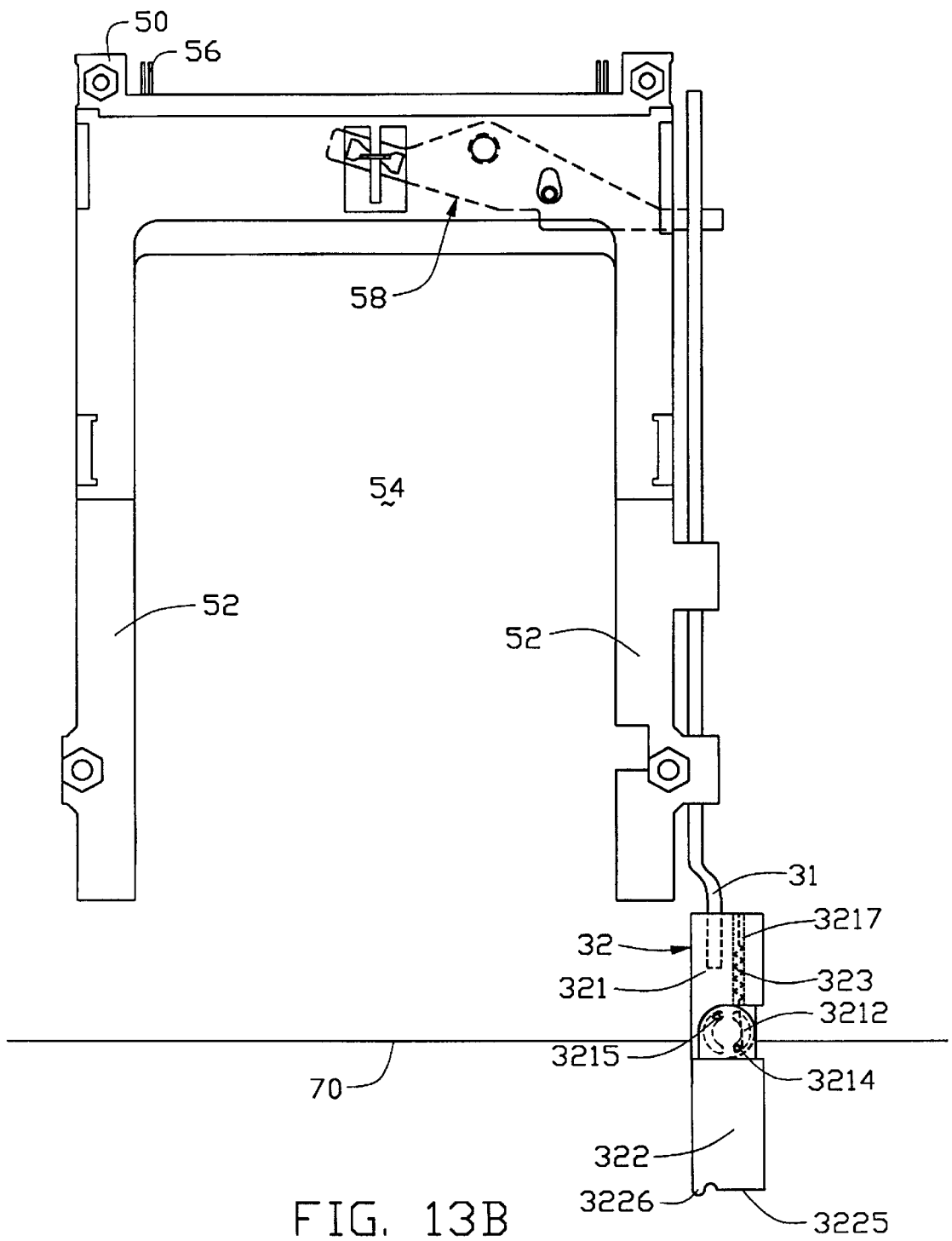
FIG. 13B is a top view of FIG. 10 showing the movable block of the button section at a working position.

When located at the stowed position, the movable block 322 is substantially normal to the fixed block 321 and is substantially hidden in a casing 70 (FIG. 13A). When located at the working position, the movable block 322 is substantially aligned with the fixed block 321 and extends beyond the casing 70 (FIG. 13B) thereby allowing a user to apply an axial force to push the card release bar 31 inward.

The pins 3214, 3215 are engageable with ends of the arcuate slots 3212, 3213 for stopping the pivotal movement of the movable block 322 toward the stowed position and the working position.

A slot 3217 is defined in the fixed block 321 substantially parallel to the top and bottom faces 360, 362 thereof for accommodating the spring 323 therein. The spring 323 has a first end 378 engaging with a rear face 380 of the fixed block 321 and a second end 382 attached to the pin 3214 thereby applying a force to bias the movable block 322 toward the stowed position.

The movable block 322 forms a projection 3226 on an outer face 3225 thereof for allowing a user to grip and move the movable block 322 toward the working position. The spring 323 automatically drives the movable block 322 back to the stowed position once the movable block 322 is released by the user.

Although the present invention has been described with reference to the preferred embodiments, it is apparent to those skilled in the art that a variety of modifications and changes may be made without departing from the scope of the present invention which is intended to be defined by the appended claims.

What is claimed is:

1. An electronic card connector comprising:

an insulative header retaining a plurality of contact elements therein, and two guide arms extending from opposite ends of the header defining a card receiving space therebetween adapted to receive an electronic card, a card release mechanism operable by a card release bar for releasing the electronic card from the connector;

the card release bar being movably mounted to one of the guide arms for driving the card release mechanism to release the electronic card, a foldable button comprising a fixed block fixed to a free end of the card release bar, and a movable block pivotally mounted to the fixed block to be pivotally movable between a stowed position in which the movable block is substantially normal to the fixed block, and a working position in which the movable block is substantially aligned with the fixed block thereby allowing a user to apply an axial force to push the card release bar, and biasing means for automatically biasing the movable block toward the stowed position;

two recesses defined in top and bottom faces of the fixed block and forming a recessed section of the fixed block;

two spaced tabs formed on the movable block for being slidably received in the corresponding recesses of the fixed block; and two arcuate slots having a common center and defined in the recessed section of the fixed block, two pins being mounted to the tabs of the movable block and respectively movably received in the arcuate slots for guiding the pivotal movement of the movable block about the center between the stowed position and the working position; wherein said biasing means is a helical spring, and a slot is defined in the fixed block parallel to the top and bottom faces thereof for accommodating the helical spring, the helical spring having a first end attached to the fixed block and a second end fixed to one of said two pins of the movable block.

2. The electronic card connector as claimed in claim 1, wherein each recess of the fixed block is defined by an arcuate side wall which cooperates with an arcuate edge of the corresponding tab of the movable block for smoothly guiding the pivotal movement of the movable block.

3. The electronic card connector as claimed in claim 2, wherein the arcuate side wall has an extension abutting against an edge of the corresponding tab for stopping the pivotal movement of the movable block at the working position.

* * * * *